United States Patent
Noldus

(10) Patent No.: US 9,756,087 B2
(45) Date of Patent: Sep. 5, 2017

(54) METHOD, SYSTEM AND NETWORK NODES FOR PERFORMING A SIP TRANSACTION IN A SESSION INITIATION PROTOCOL BASED COMMUNICATIONS NETWORK

(71) Applicant: Telefonaktiebolaget L M Ericsson (publ), Stockholm (SE)

(72) Inventor: Rogier August Caspar Joseph Noldus, Goirle (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/715,687

(22) Filed: May 19, 2015

(65) Prior Publication Data
US 2015/0256562 A1    Sep. 10, 2015

Related U.S. Application Data

(63) Continuation of application No. 13/511,586, filed as application No. PCT/EP2009/065936 on Nov. 26, 2009, now Pat. No. 9,065,837.

(51) Int. Cl.
*H04L 29/06* (2006.01)

(52) U.S. Cl.
CPC ........ *H04L 65/1069* (2013.01); *H04L 65/105* (2013.01); *H04L 65/1006* (2013.01); *H04L 65/1016* (2013.01)

(58) Field of Classification Search
CPC ............. H04L 65/1069; H04L 65/1006; H04L 65/105; H04L 65/1016

(Continued)

(56) References Cited

U.S. PATENT DOCUMENTS

| | | | | |
|---|---|---|---|---|
| 5,805,691 A | * | 9/1998 | Dendi | H04M 3/58 370/217 |
| 6,898,278 B1 | * | 5/2005 | Li | H04L 29/06027 379/229 |

(Continued)

FOREIGN PATENT DOCUMENTS

| | | | | |
|---|---|---|---|---|
| CA | WO 02103977 A2 | * | 12/2002 | ....... H04L 29/06027 |
| DE | EP 2081356 A1 | * | 7/2009 | ......... H04L 63/0227 |

(Continued)

OTHER PUBLICATIONS

Rosenberg, J., et al. "SIP: Session Initiation Protocol" Jun. 1, 2002. pp. 1-269. The Internet Society, Geneva, Switzerland.

(Continued)

*Primary Examiner* — Kostas Katsikis
(74) *Attorney, Agent, or Firm* — Coats & Bennett, PLLC

(57) ABSTRACT

Methods, systems and network nodes for performing a SIP transaction are provided. In one exemplary embodiment, a method, performed by a second node of sending a Session Initiation Protocol (SIP) message in a SIP-based communications network from a first node to a third node using the second node, may include receiving, by the second node acting as a SIP proxy, from the first node, the SIP message. Further, the method may include determining routing information for forwarding the SIP message to the third node. Also, the method may include sending, by the second node, to the first node, a pivot request to request that the first node forward the SIP message directly to the third node without traversing the second node. The pivot request may include the routing information.

19 Claims, 2 Drawing Sheets

(58) Field of Classification Search
USPC .......................................... 709/203; 370/352
See application file for complete search history.

(56) References Cited

U.S. PATENT DOCUMENTS

| | | | |
|---|---|---|---|
| 7,068,598 B1* | 6/2006 | Bryson | H04L 29/06 370/230 |
| 7,080,151 B1 | 7/2006 | Borella et al. | |
| 7,343,398 B1 | 3/2008 | Lownsbrough | |
| 7,844,851 B2 | 11/2010 | Cosmadopoulos et al. | |
| 7,933,994 B1 | 4/2011 | Mangal et al. | |
| 7,945,029 B1 | 5/2011 | Wageman | |
| 8,385,232 B1* | 2/2013 | Chen | H04M 3/465 370/259 |
| 2003/0007497 A1* | 1/2003 | March | H04L 29/06027 370/410 |
| 2003/0072430 A1* | 4/2003 | Berranger | H04M 3/2254 379/210.01 |
| 2003/0204599 A1 | 10/2003 | Trossen et al. | |
| 2003/0229718 A1 | 12/2003 | Tock et al. | |
| 2004/0015589 A1 | 1/2004 | Isozu | |
| 2004/0193727 A1* | 9/2004 | Varga | H04L 29/06 709/238 |
| 2004/0228352 A1 | 11/2004 | Constantinof | |
| 2004/0258049 A1* | 12/2004 | Sylvain | H04L 12/6418 370/352 |
| 2006/0013147 A1* | 1/2006 | Terpstra | H04L 67/1004 370/252 |
| 2006/0242300 A1* | 10/2006 | Yumoto | H04L 29/06027 709/226 |
| 2006/0282540 A1* | 12/2006 | Tanimoto | H04L 29/06027 709/228 |
| 2007/0047516 A1 | 3/2007 | Kottilingal | |
| 2007/0064684 A1 | 3/2007 | Kottilingal | |
| 2007/0081518 A1* | 4/2007 | Jain | H04L 29/06027 370/352 |
| 2007/0100981 A1 | 5/2007 | Adamczyk et al. | |
| 2007/0121890 A1 | 5/2007 | Li et al. | |
| 2007/0133465 A1 | 6/2007 | Promenzio et al. | |
| 2007/0153813 A1 | 7/2007 | Terpstra et al. | |
| 2007/0198681 A1* | 8/2007 | Bakke | H04L 65/1006 709/223 |
| 2007/0291734 A1 | 12/2007 | Bhatia et al. | |
| 2008/0077657 A1 | 3/2008 | Tagami et al. | |
| 2008/0090569 A1 | 4/2008 | Khan et al. | |
| 2008/0092226 A1 | 4/2008 | Horvath et al. | |
| 2008/0098121 A1 | 4/2008 | Wu | |
| 2008/0162637 A1 | 7/2008 | Adamczyk et al. | |
| 2008/0268818 A1* | 10/2008 | Keller | H04W 4/16 455/414.1 |
| 2008/0304510 A1 | 12/2008 | Qu | |
| 2008/0310312 A1 | 12/2008 | Acharya et al. | |
| 2008/0313348 A1 | 12/2008 | Morris et al. | |
| 2009/0037589 A1* | 2/2009 | Yamazaki | H04L 29/12594 709/227 |
| 2009/0129580 A1* | 5/2009 | Terpstra | H04L 45/04 379/232 |
| 2009/0310484 A1* | 12/2009 | Sisalem | H04L 12/66 370/230 |
| 2010/0293407 A1 | 11/2010 | Locasto et al. | |
| 2010/0312896 A1 | 12/2010 | Ait-Ameur et al. | |
| 2011/0029812 A1 | 2/2011 | Lu et al. | |
| 2011/0131318 A1 | 6/2011 | Maes | |
| 2011/0225307 A1 | 9/2011 | George et al. | |
| 2012/0102205 A1 | 4/2012 | Tanimoto | |
| 2012/0124222 A1 | 5/2012 | Noldus et al. | |

FOREIGN PATENT DOCUMENTS

| | | | | |
|---|---|---|---|---|
| EP | 1684485 A1 | * | 7/2006 | ............ H04L 69/16 |
| FR | 2 907 294 A1 | | 4/2008 | |
| JP | CN 1893435 A | * | 1/2007 | ....... H04L 29/06027 |
| JP | 2008027189 A | | 2/2008 | |
| WO | 2004075507 A2 | | 9/2004 | |
| WO | 2008001247 A2 | | 1/2008 | |
| WO | 2010133237 A1 | | 11/2010 | |
| WO | 2011020494 A1 | | 2/2011 | |
| WO | 2011047720 A1 | | 4/2011 | |

OTHER PUBLICATIONS

Rosenberg, J. "Applying Loose Routing to Session Initiation Protocol (SIP) User Agents (UA)" IETF Standard-Working-Draft. Jan. 25, 2008.

voip-info.org. "SIP Redirect Server" SIP RFC, p. 1, May 3, 2014; available at: http://www.voip-info.org/wiki/view/SIP+redirect+server.

Dialogic Corp. "SIP Redirect" Dialogic.com, p. 1-2, Dec. 2, 2014; available at: http://www.dialogic.com/webhelp/bordernet2020/1.0.0/webhelp/sip_redirect.htm.

Cheng et al., "Reducing idle mode power consumption of cellularNoWLAN dual mode mobiles." Global Telecommunications Conference, 2005. Globecom '05. IEEE, vol. 5, No. pp. 5 pp. 2906, 2-2 Dec. 2005 dol: 10.1109/GLOCOM.2005.1578289.

Subramanian et al., Comparative Study of M/M/1 and MID/1 Models of a SIP Proxy Server: Telecommunication Networks and V Applications Conference, 2008. ATNAC 2008. Australasian, vol., No., pp. 397.402, Dec. 7-10, 2008 doi: 10.1109/ATNAC.2008. 4783357.

* cited by examiner

METHOD, SYSTEM AND NETWORK NODES FOR PERFORMING A SIP TRANSACTION IN A SESSION INITIATION PROTOCOL BASED COMMUNICATIONS NETWORK

CROSS-REFERENCE TO RELATED APPLICATIONS

This application is a continuation of U.S. patent application Ser. No. 13/511,586, filed Jul. 16, 2012, which is the National Stage of International App. No. PCT/EP2009/065936, filed Nov. 26, 2009, all of which are entitled "METHOD, SYSTEM AND NETWORK NODES FOR PERFORMING A SIP TRANSACTION IN A SESSION INITIATION PROTOCOL BASED COMMUNICATIONS NETWORK," and all of which are hereby incorporated by reference as if fully set forth herein.

TECHNICAL FIELD

The invention relates to transfer of a message in a Session Initiation Protocol (SIP) based communications network in general. The invention relates to a method, system and network nodes for performing a SIP transaction in a Session Initiation Protocol based communications network. More in particular the invention relates to a Voice over Internet Protocol (VoIP) network, e.g. implemented as an Internet Protocol (IP) Multimedia Subsystem (IMS) network.

BACKGROUND

In a Session Initiation Protocol (SIP) based communications network SIP transactions, such as SIP Invite transactions, are performed. According to known methods, these transactions generally include SIP messages being sent from a first node to a third node via a second node. For example during a SIP call, SIP messages may be transmitted from a User Agent (UA) via a Proxy Call Session Control Function (P-CSCF) entity to a Serving Call Session Control Function (S-CSCF) entity, from a P-CSCF via an S-CSCF entity to an Interrogating Call Session Control Function (I-CSCF) entity, or from a first S-CSCF entity via an I-CSCF entity to a second S-CSCF entity.

SUMMARY

It has been found that some proxies which participate in such Session Initiation Protocol (SIP) transaction are idle for a relatively large proportion of the duration of the transaction. There is, hence, an unnecessary claim on the resources of such proxies. This translates into an unnecessary load on the SIP based communications network.

It is therefore an object of the present invention to reduce the idle time of some proxies in a SIP based communications network. More in general it is an object of the invention to improve network efficiency in a SIP based communications network.

Thereto, according to the invention is provided a method of performing a SIP transaction, such as a SIP Invite transaction, in a Session Initiation Protocol based communications network from a first node to a third node via a second node, wherein the second node acts as a proxy that receives a SIP message from the first node and, instead of forwarding the message to the third node, transmits a request, herein referred to as pivot request, to the first node. Said pivot request may request the first node to take over responsibility of the transaction. Said pivot request may request the first node to forward the message to the third node, wherein the first node forwards the message to the third node in response to receiving said pivot request. During the remainder of the SIP transaction further SIP messages may be exchanged between the first and third node directly, i.e. without traversing the second node.

It has been found that in a SIP based communications network wherein SIP messages are being sent from a first node to a third node via a second node acting as a proxy, some second nodes involved in a basic SIP call need to act only on the forwarding of an initial SIP Invite request. These second nodes may add, remove, and/or modify a SIP header in the Invite request message or may modify the request-Universal Resource Identifier (URI). According to the prior art, these second nodes, e.g. proxies, must still remain in the SIP signaling for the entire SIP Invite transaction. This implies that these second nodes need to keep both a server transaction model instance and a client transaction model instance active for the duration of the Invite transaction, without asserting functional control over the Invite transaction. A node, i.e. a proxy, like an Interrogating Call Session Control Function (I-CSCF) entity needs to keep its service logic active unnecessarily; once the I-CSCF has forwarded the SIP Invite, it has no further functional control over the call. Hence, client and server state model instance for the Invite transaction are kept active unnecessarily long. There is, hence, unnecessary load on SIP nodes, such as proxy entities and SIP Application Servers (AS's), in the form of idle service logic instances and idle state model instances.

The invention alleviates this problem by having the second node, instead of forwarding the message towards the third node, requesting the first node to take responsibility of forwarding the message to the third node. The request to the first node to take responsibility is named a "pivot request" herein, as to designate the pivoting effect of this action regarding the remainder of the transaction being performed by the first node. Hence, the second node may refrain from remaining actively engaged in the SIP transaction. It will be appreciated that herein the first node may be any previous node that submitted a message towards the second node in order for the message to be forwarded to the third node. As such, one or more further network nodes may be present for forwarding the message from the first node to the second node, and for forwarding the pivot request from the second node to the first node.

Optionally, the pivot request includes information associated with the third node. The pivot request may e.g. include the network address of the third node. The pivot request may be designed to request the first node to modify the message prior to forwarding the message to the third node. The first node may be arranged to modify the message prior to forwarding. The first node may e.g. add, remove, and/or modify a SIP header in the Invite request message or may modify the request-Universal Resource Identifier (URI). Such addition, removal and/or modification may include using information obtained from the second node. The first node may modify the message prior to forwarding the message to the third node upon receiving the pivot request, optionally on the basis of information associated with the third node included in the pivot request.

Optionally, the first node indicates to the second node that it is arranged for receiving the pivot request and in response to the pivot request forwarding the message to the third node. The first node may also indicate to the second node that it is arranged for receiving the pivot request and in response to the pivot request taking over responsibility of the transaction. Preferably, the first node indicates so prior to receiving the pivot request from the second node.

Optionally, the Session Initiation Protocol based communications network is an Internet protocol Multimedia Subsystem communications network. Optionally the second node is an I-CSCF entity or Breakout Gateway Control Function (BGCF) entity. Optionally the first node acts as non-record routing proxy, as record routing proxy or as Back-to-Back User Agent (B2BUA), such as a P-CSCF entity, an S-CSCF entity or a SIP-AS.

Optionally, the SIP message is the initiating message of a SIP session, such as a SIP Invite request.

Optionally, the pivot request has the form of a 3xx response. Herein 3xx response means a SIP response having a status code value in the range 300-399.

The invention also relates to a system for performing a SIP transaction, such as a SIP Invite transaction, in a Session Initiation Protocol based communications network, the system comprising a first network node and a second network node, wherein the first network node is arranged for transmitting to the second network node a SIP message that is to be forwarded to a recipient node, wherein the second network node acts as a proxy arranged for receiving the SIP message from the first network node and is arranged for, instead of forwarding the message to the recipient node, transmitting a pivot request to the first network node requesting the first network node to take over responsibility of the transaction and to forward the message to the recipient node, wherein the first network node is arranged for forwarding the message to the recipient node in response to the pivot request, and wherein the first network node is arranged for transmitting further SIP messages to the recipient node and is arranged for receiving further SIP messages from the recipient node during the remainder of the SIP transaction. Herein the further messages do not traverse the second node.

The invention also relates to a first network node of this system. The invention also relates to a second network node of this system.

The invention also relates to a network node acting as a proxy for acting in a SIP transaction, such as a SIP Invite transaction, in a Session Initiation Protocol based communications network, wherein the network node is arranged for receiving from a sending node a SIP message that is to be forwarded to a recipient node, and is arranged for, instead of forwarding the message to the recipient node, transmitting a pivot request to the sending node requesting the sending node to forward the message to the recipient node. Herein the message forwarded by the sending node to the recipient node does not traverse the network node. Herein the pivot request may also request the sending node to take over responsibility of the transaction.

Optionally, the pivot request comprises information associated with the recipient node, e.g. as set out with respect to regular SIP routing methodology.

Optionally, said network node is an I-CSCF entity or BGCF entity.

Optionally, the SIP message is the initiating message of a SIP session, such as a SIP Invite request.

Optionally, the pivot request has the form of a 3xx response.

The invention also relates to a network node for acting in a SIP transaction, such as a SIP Invite transaction, in a Session Initiation Protocol based communications network, wherein the network node is arranged for transmitting to a forwarding node, e.g. acting as a proxy, a SIP message that is to be forwarded to a recipient node; receiving from the forwarding node a pivot request requesting the network node to forward the message to the recipient node; forwarding the message to the recipient node in response to the pivot request; and transmitting further SIP messages to the recipient node and receiving further SIP messages from the recipient node during the remainder of the SIP transaction. Herein the further SIP messages do not traverse the forwarding node. Herein the pivot request may also request the sending node to take over responsibility of the transaction.

Optionally, the pivot request comprises information associated with the recipient node, e.g. as set out with respect to regular SIP routing methodology Optionally, the network node is arranged for modifying the message prior to forwarding the message to the recipient node, optionally on the basis of the information associated with the recipient node, e.g. as set out with respect to regular SIP routing methodology.

Optionally, the network node is arranged for indicating to the forwarding node that the network node is arranged for receiving the pivot request and in response to the pivot request forwarding the message to the recipient node. The network node may also indicate to the forwarding node that the network node is arranged for taking over responsibility of the transaction in response to the pivot request. Optionally, the network node is arranged for indicating so prior to receiving the pivot request.

Optionally, the network node acts as non-record routing proxy, as record routing proxy entity or as B2BUA, such as a P-CSCF entity, an S-CSCF entity or a SIP-AS.

Optionally, the SIP message is the initiating message of a SIP session, such as a SIP Invite request.

Optionally, the pivot request has the form of a 3xx response.

BRIEF DESCRIPTION OF THE DRAWINGS

The invention will now be further elucidated by means of non-limiting examples referring to the drawings, in which.

DETAILED DESCRIPTION

The present invention relates to a method, system and network nodes for performing a Session Initiation Protocol (SIP) transaction, such as a SIP Invite transaction, in a SIP based communications network from a first node to a third node via a second node.

Herein the network nodes are sometimes also referred to as servers, or more specific indications, for example Interrogating Call Session Control Function entity, depending on their function within the network. A network node acting as a proxy herein is also referred to as a proxy.

The present invention proposes a method whereby a proxy applies 'pivot routing' for the onward routing of a SIP Invite or other SIP request message. When a SIP proxy that is processing a SIP Invite and that wants to forward the Invite to a next node, wherein information contained in the Invite is modified prior to forwarding by the proxy, the proxy may return a pivot route request to the previous, i.e. upstream, server. Herein the modification of the information may include modification of a Request-Universal Resource Identifier (R-URI) and/or modification of a SIP header, as appropriate for that proxy. Said pivot route request, which may have the form of a designated 3xx response, constitutes a request to said previous server to assume the responsibility of forwarding the SIP Invite, with modified information. Herein 3xx response means a SIP response having a status code value in the range 300-399. This modified information will correspond to the modified information that would otherwise be used by the SIP proxy itself, when it would not request the pivot routing.

The proxy may apply the pivot routing when the previous server had indicated that it supports such SIP pivot routing. A SIP server may indicate that it supports pivot routing when it will in any case act as non-record routing proxy, as record routing proxy or as Back-to-Back User Agent (B2BUA). A Proxy Call Session Control Function (P-CSCF) entity will typically act as B2BUA. A Serving Call Session Control Function (S-CSCF) entity would, strictly speaking, not have to apply record routing, since it is involved only in the onward routing of the Invite request. An Interrogating Call Session Control Function (I-CSCF) entity will normally not apply record routing.

Figure 1:
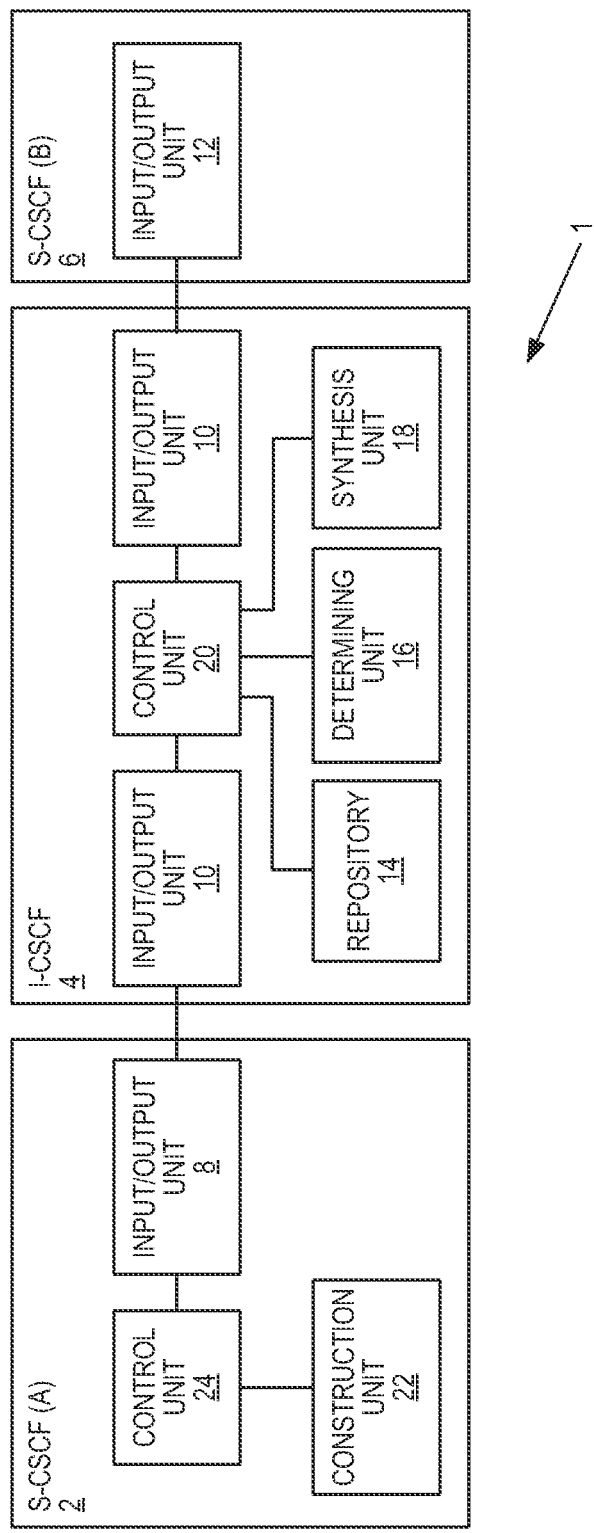
FIG. 1 shows a schematic representation of an example of a portion of a network according to the invention.

FIG. 1 shows a schematic representation of an example of system 1 forming a portion of a network according to the invention. In this example, the SIP based communications network is an Internet Protocol (IP) Multimedia Subsystem (IMS) communications network. In FIG. 1 the system 1 comprises a first S-CSCF entity 2, an I-CSCF entity 4 and a second S-CSCF entity 6.

In this example, when the I-CSCF entity 4 is processing a SIP Invite received from the first S-CSCF entity associated with an originating subscriber, herein also referred to as S-CSCF(A), and destined for the second S-CSCF entity 6 associated with a destination subscriber, referred to as S-CSCF(B), it may request pivot routing to the preceding S-CSCF entity 2. I.e. the I-CSCF entity 4 may request S-CSCF(A) to take responsibility of forwarding the Invite to S-CSCF(B) directly. The communication between S-CSCF (A) 2 and the I-CSCF 4 will be conducted using input/output units 8 and 10, respectively.

The I-CSCF entity comprises a repository 14 including information relating to the destination subscriber, such as for instance the network address of the S-CSCF(B) associated with the destination subscriber. The I-CSCF entity 4 comprises a determining unit 16 for determining which changes need to be made to the SIP Invite for allowing the SIP Invite to be forwarded to S-CSCF(B) 6. Such required changes may include 1. topmost route header, for routing to S-CSCF(B);
2. modified Request-URI, e.g. sip:URI transformed to tel:URI;

The I-CSCF entity 4 further comprises a synthesis unit 18 for including information representative of the required changes in a pivot request to be sent to S-CSCF(A) 2. In this example, the pivot request has the form of a 3xx response. It will be noted that the I-CSCF entity 4 in this example further comprises control unit 20 for controlling the input/output unit 10, the repository 14, the determining unit 16 and the synthesis unit 18.

S-CSCF(A) 2 will, when receiving the designated 3xx response, construct the required Invite, using a construction unit 22, and send the Invite to S-CSCF(B) directly using the input/output unit 8. S-CSCF(A) 2 uses its own address to set the Via header, so any response on this Invite request will be sent to S-CSCF(A) 2 directly. Thus, the I-CSCF entity 4 is in this example no longer participating in communication between S-CSCF(A) and S-CSCF(B) during this SIP transaction. It will be noted that S-CSCF(A) 2 in this example further comprises a control unit 24 for controlling the input/output unit 8 and for controlling the construction unit 22.

It will be appreciated that I-CSCF entities and S-CSCF entities are part of the Internet Protocol Multimedia Subsystem (IMS) core network and will typically be on the same software release, hence, both the I-CSCF entities and the S-CSCF entities may be easily prepared for applying pivot routing.

Figure 2:
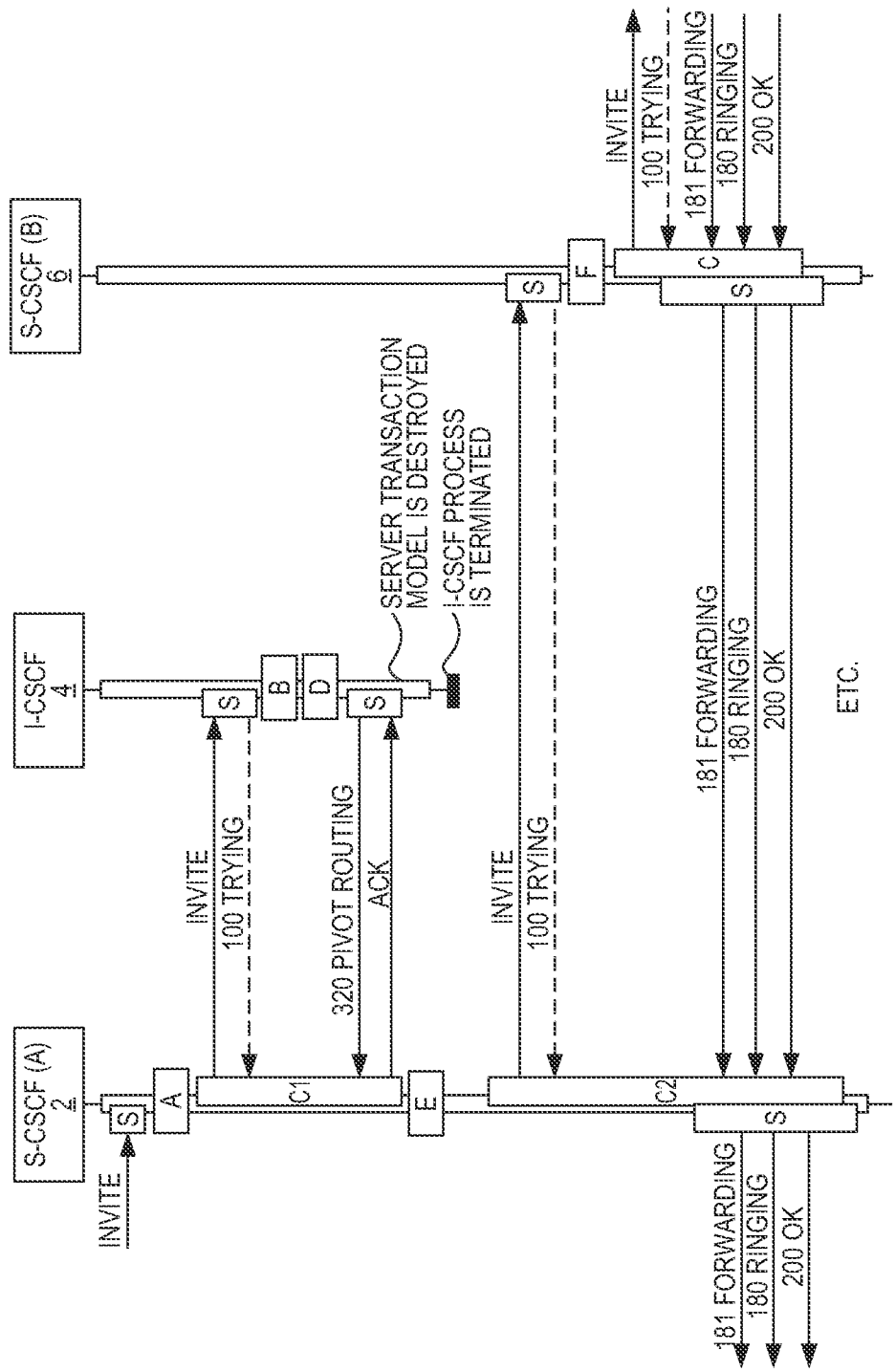
FIG. 2 shows an example of pivot routing between an S-CSCF entity and an I-CSCF entity.

FIG. 2 shows an example of pivot routing between an S-CSCF entity and an I-CSCF entity. In this example, S-CSCF(A) 2 receives an Invite request for which it will spawn an Invite server transaction model instance (S). This Invite request may come e.g. from a Session Initiation Protocol Application Server (SIP-AS), which returns the Invite over the IMS Service Control (ISC) reference point, in accordance with prior art. In task box A, S-CSCF(A) 2 takes the necessary steps for outbound routing, in accordance with prior art. The S-CSCF entity 2 determines, in addition, that the recipient of the Invite request, the I-CSCF entity 4, belongs to the same IMS network. S-CSCF(A) 2 includes the indication 'Pivot routing' in the Supported header in the Invite request, for example:

Supported: Pivot_routing

S-CSCF(A) 2 spawns an Invite client transaction model instance (C1) and sends the Invite request from that transaction model instance.

The I-CSCF entity 4, in this example, receives the Invite request for which it will spawn an Invite server transaction model instance (S). In task box B, The I-CSCF entity 4 performs Home Subscriber Server (HSS) interrogation and prepares the Invite to be forwarded to the next hop, as per prior art. This next hop is, in this example, S-CSCF(B) 6. So, the Invite that would be sent from the I-CSCF entity 4 would have a Route header containing the S-CSCF(B) 6 domain name. In task box D, the I-CSCF entity 4 determines that the upstream server, S-CSCF(A) 2 in this example, supports Pivot routing. The I-CSCF entity 4 will therefore send a 320 Pivot routing response to S-CSCF(A) 2. In this example, the 320 Pivot routing contains the information that S-CSCF(A) 2 needs to construct the Invite request that shall be sent to the destination that was determined by the I-CSCF entity 4, viz. S-CSCF(B) 6. In addition, the 320 Pivot routing contains the R-URI that shall be used by S-CSCF(A) 2 for forwarding the Invite. This allows that the I-CSCF entity 4 may modify the R-URI, e.g. change from SIP:URI to Tel:URI. S-CSCF(A) 2 responds with Ack on the 320 response, which is normal for non-2xx final response. Herein non-2xx response means a SIP response having a status code value outside the range 200-299. The sending of Ack by S-CSCF(A) 2 leads to destroying by S-CSCF(A) 2 of its client transaction model instance C1. The receiving of Ack by the I-CSCF entity 4 leads to destroying by the I-CSCF entity 4 of its server transaction model instance S. Reliable transmission (e.g. Transmission control Protocol (TCP)) is assumed in this example.

The I-CSCF entity 4, after having destroyed its server transaction model instance S, closes the server process. Hence, the I-CSCF entity 4 is no longer part of the SIP transaction, and can be used for other SIP transactions.

In task box E, S-CSCF(A) 2 prepares the new Invite request, using the information received from the I-CSCF entity 4 in the 320 Pivot routing. In this example, Max-Forwards will be decremented by 1. S-CSCF(A) 2 is now ready to send the Invite request to S-CSCF(B) 6, according to normal SIP server routing rules. The downstream forwarding of the Invite will not traverse the I-CSCF entity 4. In this example, S-CSCF(A) 2 uses its own address to set the Via header in the Invite to S-CSCF(B) 6.

When the I-CSCF entity 4 contacts the HSS, it may receive information from the HSS that the I-CSCF entity 4 shall place in the downstream Invite. Example of such information includes HSS address, which may be carried in the Proxy-User-Database SIP header. In the case of pivot routing between the I-CSCF entity 4 and S-CSCF(A) 2, the I-CSCF entity 4 preferably includes such information, if received from HSS, in the 3xx pivot request. S-CSCF(A) 2 can then include the information in the Invite towards S-CSCF(B) 6, in the same manner as it includes other information received in the 3xx pivot request in the Invite towards S-CSCF(B) 6.

From this point of the SIP transaction onwards, regular SIP routing takes place from S-CSCF(A) 2 downstream. S-CSCF(A) 2 sends Invite to S-CSCF(B) 6 according to normal signaling method. S-CSCF(A) 2 spawns again an Invite client transaction model instance, C2. S-CSCF(B) 6 will, in task box F, determine the next hop etc.

FIG. 1 shows an example sequence (181, 180, 200). Different sequences are also possible, e.g. multiple early SIP dialogues may be established for early media transport or due to SIP forking. These provisional responses do not traverse the I-CSCF entity 4.

In the case of a non-2xx final response from S-CSCF(B) 6, the Ack that is generated by S-CSCF(A) 2 forms part of the same transaction as the Invite. This Ack will, however, not traverse the I-CSCF entity 4, since S-CSCF(A) 2 had sent the Invite directly to S-CSCF(B) 6. Likewise, if the calling party cancels the call establishment, the Cancel request, the 200 Ok for this Cancel request and the resulting 487 Cancelled response on the Invite do not traverse the I-CSCF entity 4.

For the sending of a SIP Invite from an S-CSCF entity to a Breakout Gateway Control Function (BGCF) entity or from a BGCF entity to an I-CSCF entity, the same mechanism can be applied as described above. Hence, the BGCF entity may apply Pivot routing to the S-CSCF entity, after the BGCF entity has determined the next hop for the Invite. The BGCF entity may in such case have to provide the preceding S-CSCF entity with information that the BGCF entity has received from a Number portability database, such as the 'cic' parameter (Carrier Identification Code) and the 'dai' parameter (Dial Around Indicator); this information is meant for inclusion, by the S-CSCF entity, in the R-URI having Tel:URI format.

The method as described thus far, provides the advantage that Invite transaction client state models and server state models may be released as soon as they are no longer required. Hence, this method may result in saving on system capacity for entities such as I-CSCF entities and BGCF entities, but also S-CSCF entities and SIP-AS's.

It is noted that it is known that only a User Agent Server (UAS) may return a 305 Use Proxy response in response to a message. Hereby this UAS requests the User Agent Client (UAC) that originated the message to route the message through a proxy. The UAC will then route the message through a proxy, resulting in that the message will again be transmitted to this UAS, this time through a proxy, as requested by the UAS. According to the present invention, however, a proxy may return a 3xx response, such as a 320 response (let the 320 response be the pivot request). Hereby this proxy requests the upstream proxy to route the message through a proxy. The upstream proxy will then route the message through a proxy as requested. This time, the message will not arrive at the proxy that returned the 320 response again. Instead, the message will be sent directly to the proxy or UAS that was determined by the proxy that returned 320 as being the next hop or end-point.

It will thus be appreciated that the pivot route request submitted to the immediate upstream proxy by the pivot requesting proxy and signalling towards that immediate upstream proxy that that upstream proxy shall assume the responsibility of sending the SIP Invite to a next hop determined by the pivot requesting proxy instead of the pivot requesting proxy sending the SIP Invite to said next hop, is not to be confused with a re-targeting request for the UAC as transmitted by a UAS.

In the foregoing specification, the invention has been described with reference to specific examples of embodiments of the invention. It will, however, be evident that various modifications and changes may be made therein without departing from the broader spirit and scope of the invention as set forth in the appended claims.

In the examples the first node is a S-CSCF entity, the second node, i.e. proxy, is an I-CSCF entity and the third node is a S-CSCF entity. It will be appreciated that the invention may also be practised with other SIP network nodes acting as the second node proxy. It is possible that the first node is a UA, the second node is a P-CSCF entity and the third node is a S-CSCF entity. It is also possible that the first node is a P-CSCF entity, the second node is a S-CSCF entity and the third node is an I-CSCF entity. It is also possible that the first node is an I-CSCF entity, the second node is a S-CSCF entity and the third node is a P-CSCF entity. It is also possible that the first node is a S-CSCF entity, the second node is a P-CSCF entity and the third node is a UA.

However, other modifications, variations, and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

What is claimed is:

1. A method performed by a second node of sending a Session Initiation Protocol (SIP) message in a SIP-based communications network from a first node to a third node using the second node, comprising:
   receiving, by the second node acting as a SIP proxy, from the first node, the SIP message;
   determining routing information for forwarding the SIP message to the third node based on information related to the third node stored in a repository of the second node; and
   generating a pivot request, which includes the routing information, to request that the first node send the SIP message directly to the third node without traversing the second node so as to reduce a load on the SIP-based communications network;
   sending, by the second node, to the first node, the pivot request;
   receiving, by the second node, from the first node, an acknowledgement of the pivot request; and
   in response to the acknowledgement, terminating a SIP server transaction model instance, that was initiated by the second node responsive to receiving the SIP message, so as to refrain from remaining active in the SIP transaction.

2. The method of claim 1, further comprising:
determining, by the second node, whether the first node is capable of forwarding the SIP message directly to the third node without traversing the second node; and
wherein sending the pivot request is responsive to determining that the first node is capable of forwarding the SIP message directly to the third node without traversing the second node.

3. The method of claim 1, wherein the SIP message is a SIP Invite message.

4. The method of claim 1, wherein the routing information includes a Request-Universal Resource Identifier (R-URI).

5. The method of claim 1, wherein the routing information includes a portion of a SIP header of the SIP message.

6. The method of claim 2, wherein determining whether the first node is capable of forwarding the SIP message includes determining that the SIP message indicates that the first node is capable of forwarding the SIP message directly to the third node without traversing the second node.

7. The method of claim 2, wherein determining whether the first node is capable of forwarding the SIP message includes determining whether the first node is at least one of a non-record routing proxy, a record routing proxy and a Back-to-Back User Agent (B2BUA).

8. A non-transitory computer-readable medium encoded with a computer program, the computer program comprising computer-executable instructions that when executed by a processor causes the processor to perform operations, wherein the operations are configured to:
in a Session Initiation Protocol (SIP)-based communications network for sending a SIP message from a first node to a third node using a second node, receive, by the second node acting as a SIP proxy, from the first node, the SIP message;
determine, by the second node, routing information for forwarding the SIP message to the third node based on information related to the third node stored in a repository of the second node;
generate a pivot request, which includes the routing information, to request that the first node send the SIP message directly to the third node without traversing the second node so as to reduce a load on the SIP-based communications network;
send, by the second node, to the first node, the pivot request; and
receive, by the second node, from the first node, an acknowledgement of the pivot request; and
in response to the acknowledgement, terminate a SIP server transaction model instance, that was initiated by the second node responsive to receiving the SIP message, so as to refrain from remaining active in the SIP transaction.

9. A second node in a SIP-based communications network for sending a Session Initiation Protocol (SIP) message from a first node to a third node using the second node, comprising:
a memory including a repository of information related to the third node; and a processor operationally coupled to the memory, wherein the processor and the memory are configured to:
receive, from the first node, the SIP message, wherein the second node acts as a SIP proxy;
determine routing information for forwarding the SIP message to the third node based on the information related to the third node; and
generate a pivot request, which includes the routing information, to request that the first node send the SIP message directly to the third node without traversing the second node so as to reduce a load on the SIP-based communications network;
send, to the first node, the pivot request;
receive, from the first node, an acknowledgement of the pivot request; and
in response to the acknowledgement, terminate a SIP server transaction model instance, that was initiated by the second node responsive to receiving the SIP message, so as to refrain from remaining active in the SIP transaction.

10. The second node of claim 9, wherein the SIP message is modified by the first node prior to sending the SIP message to the third node based on the routing information included in the pivot request.

11. The second node of claim 9, wherein the SIP message is a SIP Invite message.

12. The second node of claim 9, wherein the routing information includes a Request-Universal Resource Identifier (R-URI).

13. The second node of claim 9, wherein the routing information includes a portion of a SIP header of the SIP message.

14. The second node of claim 9, wherein the processor and memory are further configured to:
determine whether the first node is capable of forwarding the SIP message directly to the third node without traversing the second node; and
wherein sending the pivot request is responsive to determining that the first node is capable of forwarding the SIP message directly to the third node without traversing the second node.

15. The second node of claim 14, wherein determining whether the first node is capable of forwarding the SIP message includes the processor and memory being further configured to determine whether the first node is at least one of a non-record routing proxy, a record routing proxy and a Back-to-Back User Agent (B2BUA).

16. The second node of claim 14, wherein determining whether the first node is capable of forwarding the SIP message includes the processor and memory being further configured to determine that the SIP message indicates that the first node is capable of forwarding the SIP message directly to the third node without traversing the second node.

17. The second node of claim 9, wherein the pivot request has the form of a Session Initiation Protocol 3xx response with a status code value in the range of 300 to 399.

18. The second node of claim 9, wherein:
the SIP-based communications network is an Internet protocol Multimedia Subsystem communications network;
the second node is one of an Interrogating Call Session Control Function (I-CSCF) entity and a Breakout Gateway Control Function (BGCF) entity; and
the first node acts as one of a non-record routing proxy, a record routing proxy entity, a Back-to-Back User Agent (B2BUA) such as a Proxy Call Session Control Function (P-CSCF) entity, a Serving Call Session Control Function (S-CSCF) entity, and a Session Initiation Protocol Application Server (SIP-AS).

19. A system for performing a Session Initiation Protocol (SIP) transaction in a SIP-based communications network, comprising:

a first network node and a second network node, wherein the second network node acts as a SIP proxy;

wherein the first network node has a processor operationally coupled to a memory and is configured to send a SIP message to a third network node via the second network node;

wherein the second network node has a processor operationally coupled to a memory and is configured to:

receive, from the first network node, the SIP message;

determine routing information for forwarding the SIP message to the third network node based on information related to the third network node stored in a repository of the second network node; and generate a pivot request, which includes the routing information, to request that the first network node send the SIP message directly to the third network node without traversing the second network node so as to reduce a load on the SIP-based communications network; and send, to the first network node, the pivot request;

wherein the first network node is further configured to:

receive, from the second network node, the pivot request; and in response to receiving the pivot request:

send, to the second network node, an acknowledgement of the pivot; and forward, directly to the third network node without traversing the second network node, the SIP message; and wherein the second network node is further configured to:

receive, from the first network node, the acknowledgement of the pivot request; and in response to the acknowledgement, terminate a SIP server transaction model instance, that was initiated by the second network node responsive to receiving the SIP message, so as to refrain from remaining active in the SIP transaction.

* * * * *